United States Patent [19]
Gorman et al.

[11] Patent Number: 5,970,437
[45] Date of Patent: Oct. 19, 1999

[54] COMPUTERIZED MANAGEMENT OF PLANT MAINTENANCE AND PROGRAM THEREFOR

[76] Inventors: Alexander J. Gorman, 56 Buttonwood Rd., Peekskill, N.Y. 10566; Stephen A. Trovato, 27 Commonwealth Dr., Basking Ridge, N.J. 07920; Fehmi N. Aydin, 26 Rochelle Dr., New City, N.Y. 10956; Sherri L. Freer, 42 Camelot Rd., Poughkeepsie, N.Y. 12601

[21] Appl. No.: 08/725,564

[22] Filed: Oct. 3, 1996

[51] Int. Cl.[6] .................................................. G05B 13/02
[52] U.S. Cl. ........................... 702/184; 364/150; 364/188
[58] Field of Search ..................................... 702/184, 183, 702/22; 364/146, 188, 192, 151, 150; 376/525, 255, 259, 215; 706/23, 915

[56] References Cited

U.S. PATENT DOCUMENTS 5,271,045  12/1993  Scarola et al. .......................... 376/216
5,442,555   8/1995  Reifman ............................. 364/431.01
5,548,528   8/1996  Keeler et al. ............................ 364/497

*Primary Examiner*—Kamini Shah
*Attorney, Agent, or Firm*—Morgan & Finnegan L L P

[57] ABSTRACT

A general purpose computer is programmed to provide graphic representations of the mechanical and electrical systems of an operating plant where all of the components are treated as "objects" and associated through a relational database with text files providing component specifications, product identifications, component operating status, and all directly interconnected components including data as to flow direction and relative position in the system. For maintenance and service each component is associated with existing and future specified work orders, service requirements including consideration of probable life expectancy and the like.

32 Claims, 5 Drawing Sheets

COMPUTERIZED MANAGEMENT OF PLANT MAINTENANCE AND PROGRAM THEREFOR

BACKGROUND OF THE INVENTION

The present invention relates to maintaining and retrieving information in conjunction with the operation and maintenance of an operating plant. In particular it relates to a computerized system for maintaining the records and knowledge for overseeing plant operation and maintenance.

All operating plants must provide for appropriate maintenance of components. Particularly in those situations where the plant either can not be shut down or it is not desirable for economic or other reasons to shut it down, provision must be made for safely isolating and taking out of service components that must either be serviced or replaced. Generally speaking, this is particularly true of power generating plants, chemical and pharmaceutical plants, refineries, and the like.

The invention can best be described and understood in conjunction with the operation and maintenance of an atomic energy (nuclear) power plant. While the present invention was made to oversee the operation and maintenance of one such plant, and will be described with reference thereto, it should be understood that it is adaptable and applicable to use with various other operating plants.

In the maintenance of any operating plant it is necessary to consider safety regulations, both governmental and in house, environmental regulations and concerns, appropriate scheduling, logistics, and so forth. These considerations are particularly critical in the operation of an atomic energy power plant.

Prior to the present invention, several separate computerized databases were created and accessed by appropriate plant managers, and hard copy records and work sheets were used for manual data entry and control. For the nuclear plant under discussion, there was a Power Plant Maintenance Information System referred to hereinafter by the acronym "PPMIS"; the Nuclear Plant Master Equipment List referred to hereinafter by the acronym "NPMEL"; and the Project Resource Evaluation and Management Information System referred to hereinafter by the acronym "PREMIS". Also in use was a computer database containing "Tag-Out" information.

"Tag-Out" refers to the practice of attaching warning tags (e.g., stop work tags) to components to caution workers that the setting or operation of that component should not be altered without getting prior approval that it is safe to alter the operative condition. When a component is to be serviced it must be isolated from the system in which it is used. Valves may have to be opened or closed, switches may have to be secured in a particular condition, and all of these operations usually have to be performed in a prescribed sequence. The components that must be secured in a particular mode to isolate a selected component are said to establish the boundary for isolation, and this group of boundary components are referred to as a "Tag-Out".

To add or remove a "Tag-Out", the components that form the boundary for isolation have to be identified from process drawings (e.g., electrical and mechanical schematics). The position in which components in the isolation boundary must be placed is identified. The sequence for placing components in the proper position for the isolation is determined. The planned Tag-Out must be cross checked with other work to determine if there are conflicts (e.g., the same valve must be open for one Tag-Out and closed for another Tag-Out). The proposed Tag-Out is considered relative to operational procedures and relative to possible technical specification limitations. Finally, the Tag-Out is verified for implementation.

The majority of the tasks are performed by people using knowledge, experience and plant documents (drawings, procedures and references such as the technical specifications). Because of the human element and the tremendous amount of information that is combined from multiple sources, errors are made quite often. Moreover, the process is labor intensive and time consuming. All mistakes in the process result in considerable rework. Also, errors can lead to injury or death to personnel, damage to plant equipment, loss in plant reliability, and so forth.

Generally, maintenance is planned by: a) identifying from drawings equipment that must be placed in a particular state (for example, "closed" for a valve or "open" for an electrical breaker) to isolate another component for maintenance; b) determining the impact upon the system or plant from written procedures when available or, more frequently, from understanding of component operation; and c) determining by logical thought the sequence of safely placing the boundary components in the isolation states.

Notwithstanding the existence of the databases mentioned above, heretofore the procedure involved first identifying all of the components that are needed to completely isolate the component that is to be serviced. This was accomplished by visual examination of drawings and looking for components (e.g., valves and breakers) that may be isolated. Multiple sets of drawings had to be examined such as flow diagrams, piping and instrumentation diagrams, electric system schematic diagrams, and electric wiring diagrams. Having located the various components to provide the isolation boundary, it was necessary to determine through logical thought processes the position or state that each of the selected components had to assume. Next, it was necessary to determine logically if such positions or states would conflict with the positions or states that would be required for safe maintenance, safe operation or to satisfy regulatory requirements.

SUMMARY OF THE INVENTION

With the foregoing as background, it is an object of the present invention to provide a knowledge and data processing system that implements a component isolation evaluation program that defines how to isolate and restore the component while applying logistic, procedural and legal constraints that provide for safe, with respect to personnel and plant equipment, isolation.

Another object of the invention is to provide a computer based system which will allow the process of isolation to be performed in real time, safely and effectively.

In accordance with one aspect of the present invention there is provided for use in overseeing the maintenance and operation of an operating plant in accordance with a prerecorded program, recording media containing a series of instructions in machine readable form for programming a general purpose computer. The instructions comprise entries for enabling a user to select a discrete component from all of the components of at least a segment of an operating plant, and entries for causing the computer to use stored data to provide for the selected component the identification of all components that are directly connected to the selected component.

A further aspect of the present invention provides such recording media with entries for causing the general purpose computer to display an interactive intelligent schematic diagram of the related segment of the operating plant.

BRIEF DESCRIPTION OF THE DRAWINGS

The invention will be understood better after reading the following detailed description of the presently preferred embodiment thereof with reference to the appended drawings in which.

The same reference numerals are employed throughout the figures of the drawings to designate the same or similar component.

DETAILED DESCRIPTION OF THE PRESENTLY PREFERRED EMBODIMENT

Figure 1:
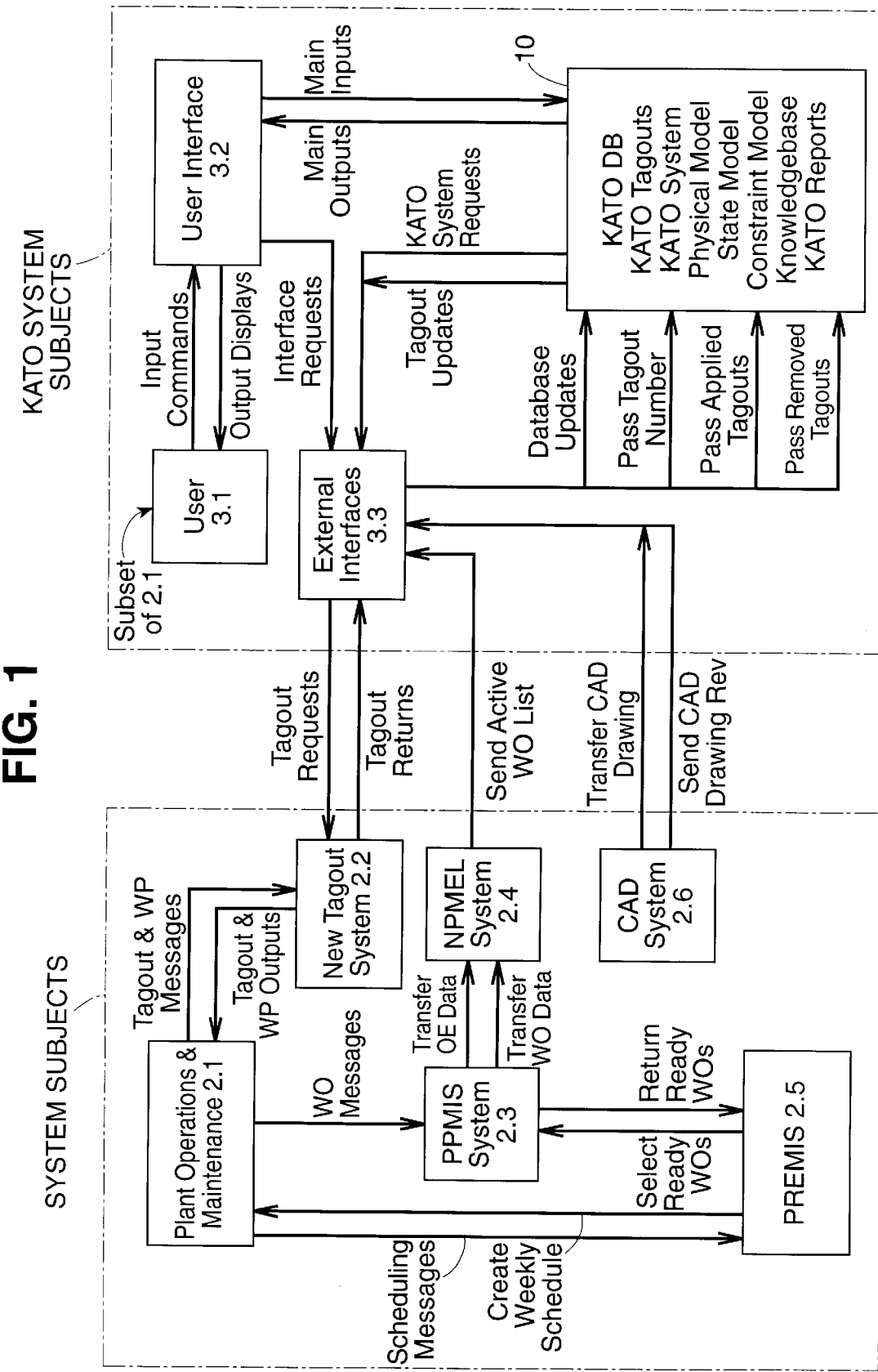
FIGS. 1 to 5 constitute a set of flow diagrams representative of the operation of a general purpose computer when programmed with the program for implementing the present invention.

Referring to the drawings, and particularly to FIG. 1, there is illustrated by way of flow charts the system resulting from suitably programming a general purpose computer to implement the subject invention.

Under the heading "SYSTEM SUBJECTS" there is shown the interrelationship of the existing database systems previously noted, namely, PPMIS System 2.3, NPMEL System 2.4, PREMIS 2.5, and the tag-out database identified as "New Tagout System 2.2". Also there is included a computer aided design or drawing program and database identified as "CAD System 2.6".

As shown in FIG. 1, under the control of "Plant Operations & Maintenance 2.1", scheduling messages are sent to PREMIS 2.5 which provides a return designated Create Weekly Schedule. WO Messages (workorder messages) are sent to PPMIS System 2.3 which exchanges workorder data with PREMIS 2.5 by way of Select Ready WOs and Return Ready WOs. The PPMIS System 2.3 also transfers both OE (Operating Equipment List) Data and WO Data to NPMEL System 2.4. In addition, Tagout and WP (Work Permit) Messages are sent to the New Tagout System 2.2 with appropriate Tagout and Work Permit Outputs returned to Plant Operations & Maintenance 2.1.

The KATO SYSTEM SUBJECTS, shown in the phantom box on the right half of FIG. 1, outlines the basic elements of the present invention. As used herein, "KATO" is a coined acronym for Knowledge Assisted Tag-Out. Among the KATO System Subjects is User 3.1, a subset of Plant Operations & Maintenance 2.1. User 3.1 supplies input commands to User Interface 3.2 and in return receives Output Displays from the latter. The User Interface 3.2 communicates with the various tables and segments of the KATO databases listed in box 10, and with the External Interfaces 3.3 which establish the interconnections between the various elements of the System Subjects and the KATO elements in box 10.

As shown, Tagout Requests travel from the External Interfaces 3.3 to the New Tagout System 2.2 with Tagout Returns coming back to the External Interfaces 3.3. The NPMEL System 2.4 sends the active workorder list via Send Active WO List to the External Interfaces 3.3. Drawings data are transferred from CAD System 2.6 to the External Interfaces 3.3 via Transfer CAD Drawing and Send CAD Drawing Rev (Revision). The External Interfaces 3.3 pass to those system components shown in box 10, Database Updates, Pass Tagout Number, Pass Applied Tagouts, and Pass Removed Tagouts. KATO System Requests and Tagout Updates are passed from the system components of box 10 to the External Interfaces 3.3.

Figure 2:
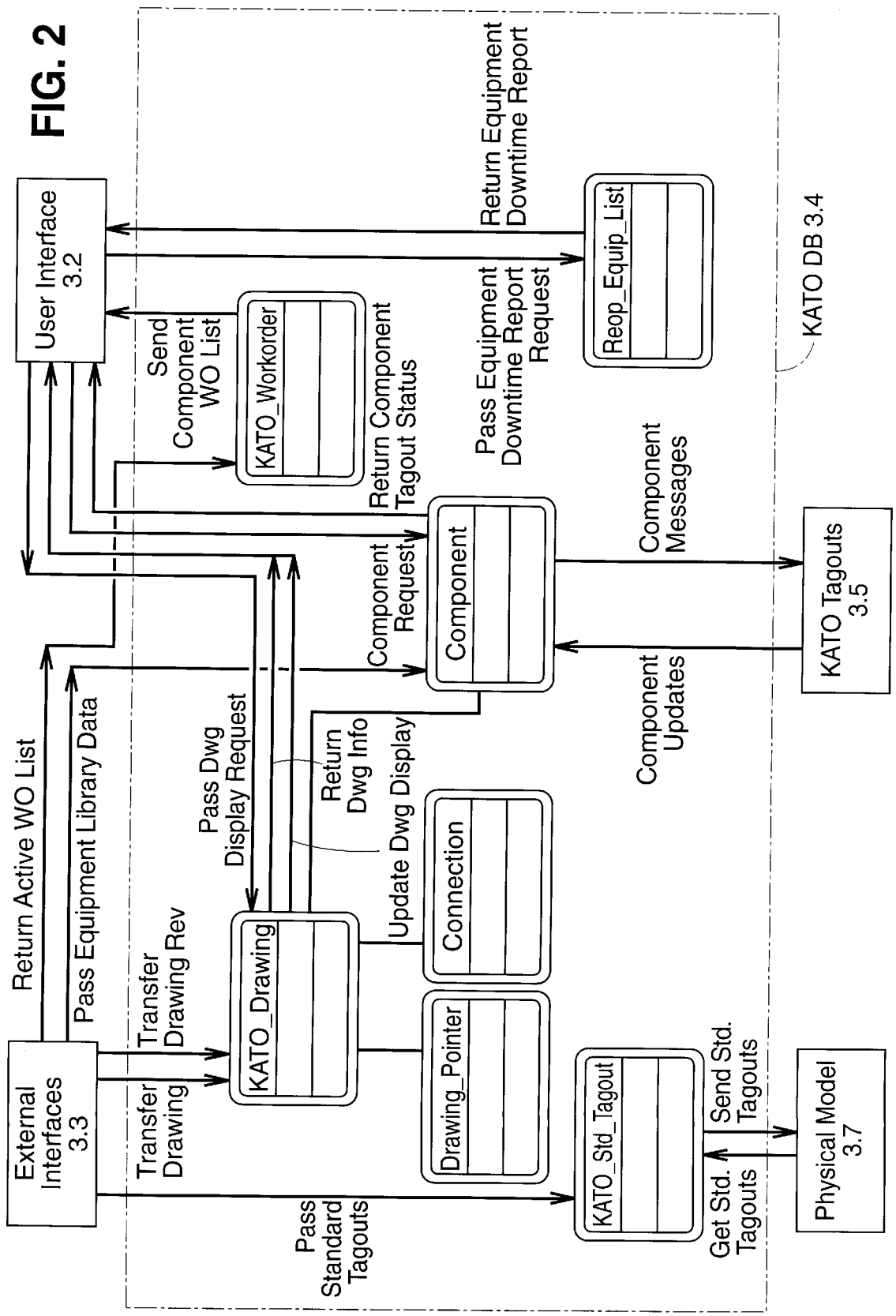
Figure 3:
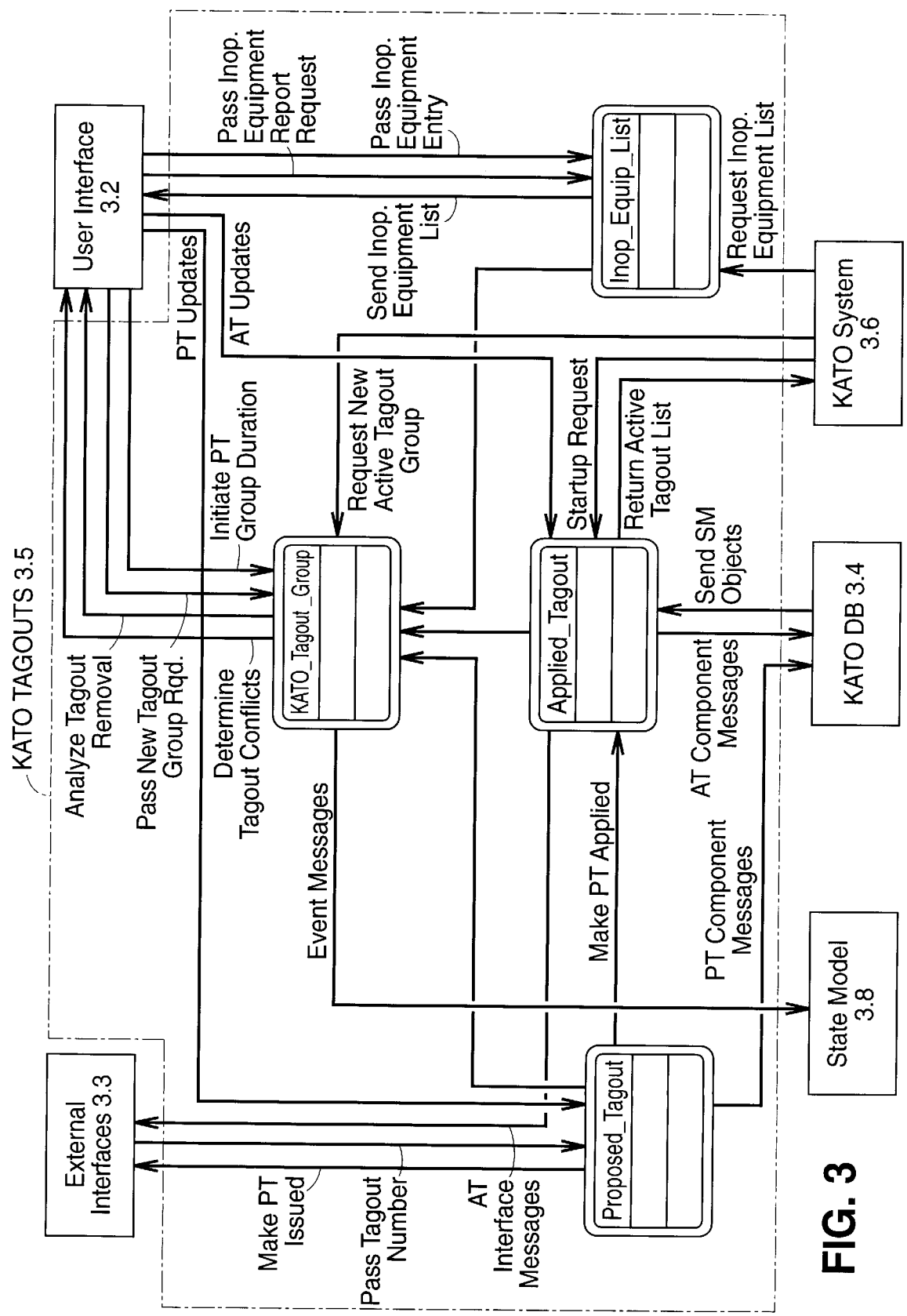

Reference should now be had to FIG. 2 which contains the details of KATO DB 3.4, indicated within the phantom lined box. The User Interface 3.2 and External Interfaces 3.3 are the elements described above with reference to FIG. 1. These elements are shown as single line boxes. Also shown as single line boxes in FIG. 2 are KATO Tagouts 3.5 and Physical Model 3.7. The details of KATO Tagouts 3.5 are shown in FIG. 3, while Physical Model 3.7 is one of the Knowledgebases included in FIG. 5.

As shown in FIG. 2, the User Interface 3.2 communicates with various tables represented by double line boxes. A drawing display request indicated by Pass Dwg Display Request is passed to the KATO_Drawing table which is associated with a Drawing_Pointer table, a Connection table, and a Component table. Drawing information and updates are returned through the User Interface 3.2 as indicated by Return Dwg Info and Update Dwg Display. Data for the KATO_Drawing table is obtained through the External Interfaces 3.3 from the CAD System 2.6 of FIG. 1. This flow is indicated by the lines labled "Transfer Drawing" and "Transfer Drawing Rev" in FIG. 2, and by "Transfer CAD Drawing" and "Send CAD Drawing Rev" in FIG. 1.

A KATO_Workorder table in FIG. 2 receives data regarding the active workorder list from the NPMEL System 2.4 by way of the External Interfaces 3.3. This is indicated in FIG. 1 by Send Active WO List, and in FIG. 2 by Return Active WO List. When requested the KATO_Workorder table provides Send Component WO List to the User Interface 3.2. A Reop_Equip_List table receives equipment downtime report requests from User Interface 3.2 indicated by Pass Equipment Downtime Report Request, and returns equipment downtime reports back through the User Interface 3.2 indicated by Return Equipment Downtime Report.

From the User Interface 3.2 component requests are presented to the Component table, indicated by Component Request, and the Component table sends Return Component Tagout Status to the User Interface 3.2. The Component table also sends Component Messages to KATO Tagouts 3.5 and receives therefrom Component Updates. The Component table also obtains equipment library data via the External Interfaces 3.3 as indicated by Pass Equipment Library Data.

A KATO_Std_Tagout table exchanges standard tagouts with Physical Model 3.7 via Send Std. Tagouts and Get Std. Tagouts. Data as to standard tagouts is obtained by the KATO_Std_Tagout table from External Interfaces 3.3 via Pass Standard Tagouts.

The details of the element, KATO TAGOUTS 3.5, are illustrated in FIG. 3 to which attention should now be directed. This element encompasses four tables, namely, Proposed_Tagout, KATO_Tagout_Group, Applied_Tagout, and Inop_Equip_List. The External Interfaces 3.3 communicates Pass Tagout Number to Proposed_Tagout which returns the instruction to issue the proposed tagout via Make PT Issued to the External Interfaces 3.3. The Proposed_Tagout sends PT Component Messages to KATO DB 3.4. The latter communicates Send SM Objects to the Applied_Tagout table where SM is an abbreviation for State Model, and receives therefrom AT Component Messages where AT is an abbreviation for Applied Tagout. Also, the Proposed_Tagout table communicates Make PT Applied instructions to the Applied_Tagout table. Finally, the Proposed_Tagout table sends data to the KATO_Tagout_Group table.

The KATO_Tagout_Group table receives communications from the User Interface 3.2 identified as Initiate PT Group Duration, and Pass New Tagout Group Rqd., the latter being requests for creating a new tagout group. The KATO_Tagout_Group table sends back to the User Interface 3.2 Determine Tagout Conflicts and Analyze Tagout Removal. The KATO_Tagout_Group table also originates Event Messages which are communicated to the State Model 3.8. In addition, Request New Active Tagout Group requests are communicated to the KATO_Tagout_Group table from the KATO System 3.6. Additional input to the KATO_Tagout_Group table is obtained from the Proposed_Tagout table, as previously mentioned, and from the Applied_Tagout table, and the Inop_Equip_List table.

The Applied_Tagout table sends AT Interface Messages concerning applied tagouts to the External Interfaces 3.3. It also sends the Return Active Tagout List request to KATO System 3.6, and receives from the latter the Startup Request instruction.

The User Interface 3.2 communicates PT Updates concerning proposed tagouts to the Proposed_Tagout table, and AT Updates concerning applied tagouts to the Applied_Tagout table. It also sends Pass Inop. Equipment Entry and Pass Inop. Equipment Report request concerning inoperative or out of service equipment to the Inop_Equip_List table from which the User Interface 3.2 obtains the Send Inop. Equipment List data. The request for the Inop. Equipment List is furnished by KATO System 3.6 to the Inop_Equip_List table as Request Inop. Equipment List.

Figure 4:
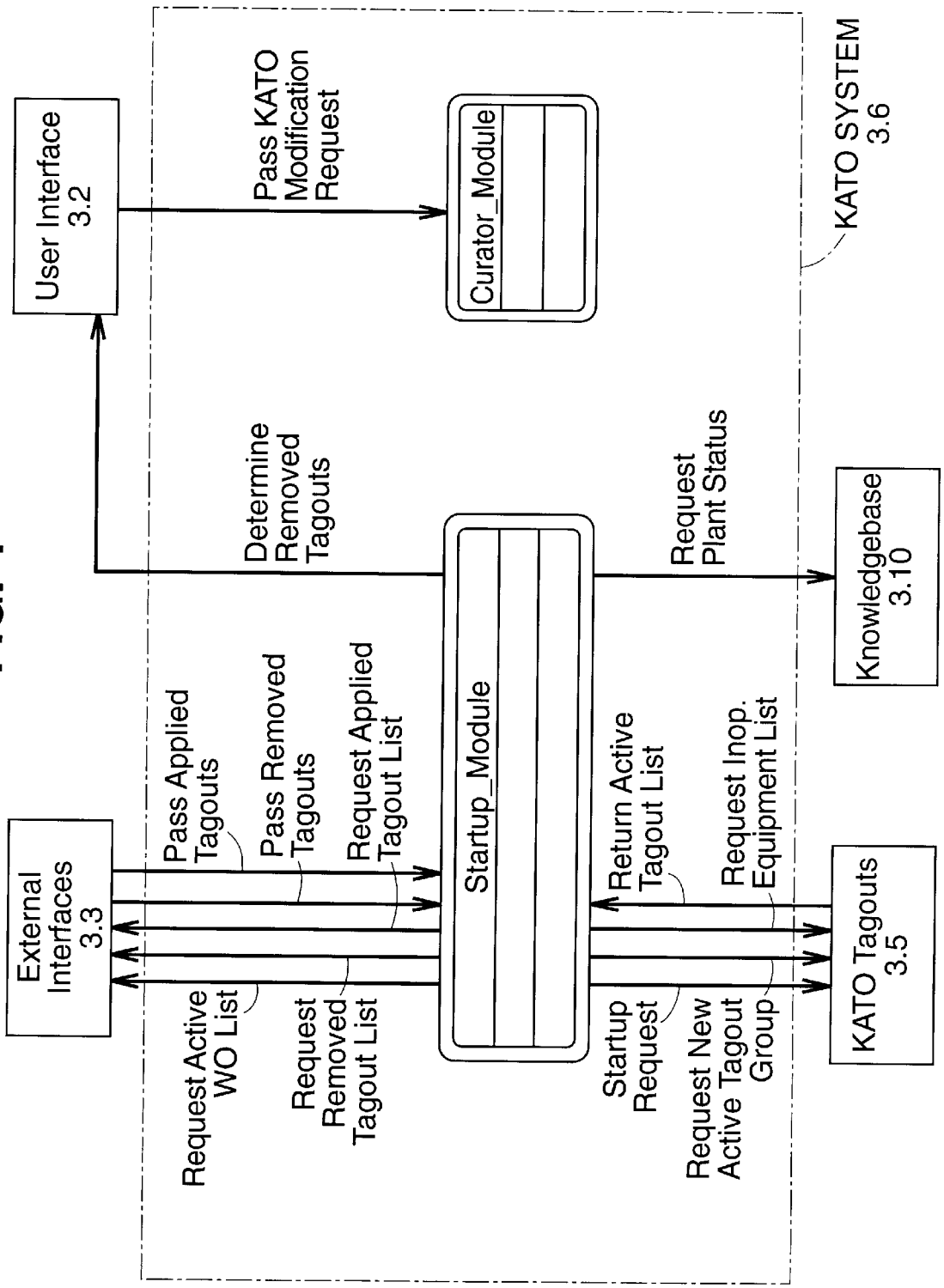

The KATO SYSTEM 3.6 is shown in FIG. 4 to encompass a Startup_Module table and a Curator_Module table. The External Interfaces 3.3 communicates Pass Applied Tagouts and Pass Removed Tagouts to the Startup_Module table. The Startup_Module table outputs to the External Interfaces 3.3 Request Active WO List, Request Removed Tagout List, and Request Applied Tagout List.

The Startup_Module table receives the Return Active Tagout List requests from KATO Tagouts 3.5, which, as seen in FIG. 3, comes from the Applied_Tagout table. Also, viewing both FIG. 4 and FIG. 3 it will be seen that the Startup_Module table is the source of the data supplied to the various tables in FIG. 3 which data is labeled Startup Request, Request New Active Tagout Group, and Request Inop. Equipment List.

Figure 5:
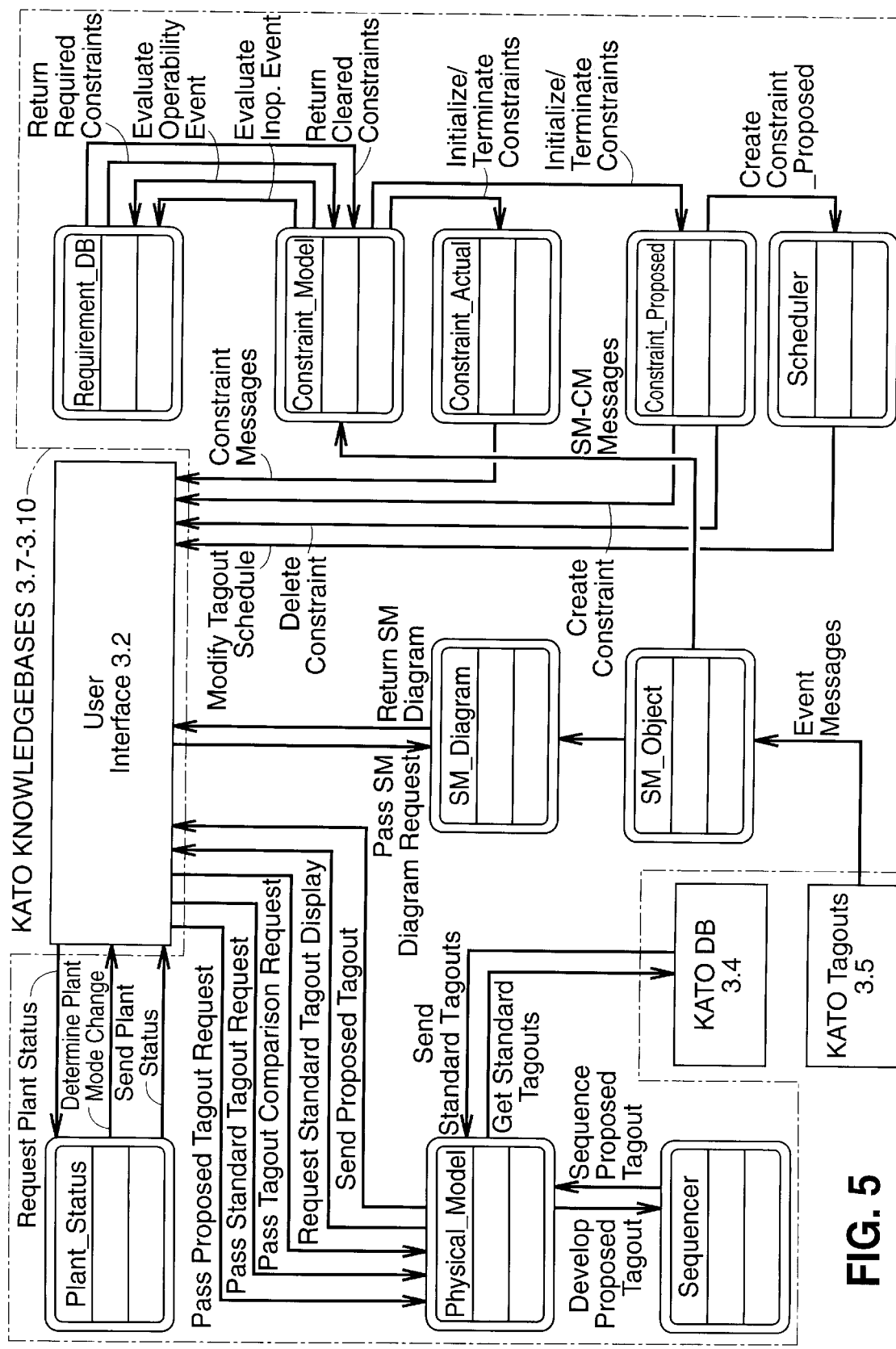

The Startup_Module table provides Determine Removed Tagouts to the User Interface 3.2, and Request Plant Status to Knowledgebase 3.10, the latter being in FIG. 5. Also shown in FIG. 4 is the communication from User Interface 3.2 to the Curator_Module table of the Pass KATO Modification Request.

Now refer to FIG. 5 which shows the arrangement of tables and the interconnections therebetween that provide the knowledgebase functions. A Plant_Status table communicates with the User Interface 3.2 furnishing Send Plant Status and Determine Plant Mode Change in response to Request Plant Status which, as seen from FIG. 4, comes from the Startup_Module.

The User Interface 3.2 is in communication with the Physical_Model table, the SM_Diagram table, the Constraint_Actual table, the Constraint_Proposed table, and the Scheduler table. Data flowing to the Physical_Model table consists of Pass Proposed Tagout Request, Pass Standard Tagout Request, and Pass Tagout Comparison Request. Data flowing in the opposite direction consists of Request Standard Tagout Display, and Send Proposed Tagout.

A Sequencer table is in communication with the Physical_Model table receiving Develop Proposed Tagout instructions and furnishing Sequence Proposed Tagout in return.

The Physical_Model table issues instructions Get Standard Tagouts to KATO DB 3.4 and receives therefrom Send Standard Tagouts. Referring to FIG. 2 it will be seen that this exchange occurs with the KATO_Std_Tagout table.

The SM_Object table receives Event Messages from KATO Tagouts 3.5. Referring to FIG. 3 it will be seen that the Event Messages are supplied by the KATO_Tagout_Group table.

Returning to FIG. 5, the SM_Object table communicates with the SM_Diagram table and with a Constraint_Model table. The SM_Diagram table exchanges data through the User Interface 3.2 consisting of Pass SM Diagram Request and Return SM Diagram.

The Constraint_Actual table sends Constraint Messages to the User Interface 3.2 and receives from the Constraint_Model table instructions to Initialize/Terminate Constraints. Similar instructions are passed from the Constraint_Model table to the Constraint_Proposed table which furnishes to the User Interface 3.2 Create Constraint instructions and Delete Constraint instructions. Create Constraint_Proposed instructions are passed to the Scheduler table which sends Modify Tagout Schedule instructions to the User Interface 3.2.

Finally, a Requirement_DB table communicates with the Constraint_Model table sending to it Return Cleared Constraints, and Return Required Constraints, receiving therefrom Evaluate Operability Event and Evaluate Inop. Event.

In the system as described above, by appropriate loading of the KATO_Drawing tables there is provided intelligent drawings with connectivity embedded. Data stored in the Connection tables provides information concerning the connected components that are up and downstream of any other component in the electrical or mechanical schematic diagrams. All directly connected components immediately adjacent each component in a diagram, including segments of pipe in the mechanical diagrams, and connecting wires or busses in the electrical diagrams, are defined as connected in the Connection database. The connection definition includes upstream and downstream data to indicate direction of flow of fluid, mass, electrical energy, heat or chemical. A CAD diagram that has sets of lines that comprise a component's picture, a name associated with the component and the connected components is defined as an intelligent drawing.

In the present invention, the intelligent drawing is made interactive by defining "objects" in the KATO_Drawing database for each component and any relationships between components such that when displayed on a computer screen each component can be selected and actions initiated to determine the relationship of the component to other components and to information in the Proposed_Tagout and Applied_Tagout tables of the KATO databases. The component information is obtained from the CAD System 2.6 and made "objects" in the KATO_Drawing database for use in display and action.

With the present system, components to be isolated are determined from work orders. The computer drawing and work order databases are searched for common component identities. The components in the drawing database that have a work order pending are highlighted on the computer screen to enable quick recognition.

Using the intelligent drawing, a component can be selected by clicking on it with a mouse. If such component is to be isolated, the operator can determine the isolation boundary for the component that will provide for personnel safety. The procedure consists of searching the KATO_Drawing database starting from the selected component for which a work order is to be implemented through the connected pipe and other components for components that can be operated to isolate the selected component. Components that can be operated to an isolation position, opened or closed, are identified for each flow, mass, electrical, heat or chemical path. The isolation position is defined by logical rules defined in the various Requirement and Constraint tables of the KATO KNOWLEDGEBASES.

As part of the selection process there is performed a check for conflicting isolations already in effect or contemplated by other pending work orders which would give rise to a conflict if implemented. The procedure consists of searching and comparing the positions defined for the isolation boundary of implemented versus proposed work orders to identify mutually exclusive events. For example, open for one work order boundary but closed for another work order boundary at the same time.

A further check is performed for logistical conflicts arising from the system or component losing required functionality if the proposed isolation is implemented. This logistical check is accomplished through the use of logical rules defining component positions that are necessary for the system or component to provide its intended function. These rules are stored in the Requirement_DB tables of the KATO KNOWLEDGEBASES.

A similar check is performed for logistical conflicts in a required system or component functionality for overall plant safety. The procedure consists of defining in the databases the logical rules for component functionality that are necessary for, the system or plant to accomplish its intended function.

Also determined is the priority for implementation of any isolation which is based on probabilistic risk or other logical prioritizing methods. This procedure consists of defining in the databases the rules for priority of work orders that selects a work order based on its relative importance when compared to other work orders on t he basis of risk or other priority criteria.

Next, the program enables the generation of an isolation list. This consists of compiling in the Component table of the KATO database the list of component names and positions for safe isolation determined as a result of the previously mentioned analysis.

Also provided by the program is the sequence for safe isolation and restoration of the equipment from and to service. This consists of defining in the databases rules for the order in which the components of a particular isolation list are to be operated for isolation or restoration. The sequence of operation may differ for isolation and restoration.

Considering the foregoing, it should be appreciated that the system involves segregating the objects and rules that are defined in the databases into three organized groups, namely: a) structural models of plant systems including the definition of component status (isolated, unisolated, open, closed, etc.) and reasoning modules; b) reasoning modules that consist of rules about, but not limited to, operational and safety functionality, regulatory constraints, for example, nuclear plant limiting conditions of operations, planning constraints, personnel safety constraints, isolation and restoration sequencing, probabilistic risk, economic worth and resource planning and scheduling; and c) state models relating components to systems and to plants for keeping track of position and status.

The system is capable of building a state logic model from a schematic diagram. The procedure consists of searching the connected paths of the intelligent schematic drawing for major and minor components. Major components and their connected lines are then defined as major paths connected by "AND" gates in a logic diagram. Major components with the same general purpose are connected by "OR" gates in the logic diagram. Minor components are connected by "AND" gates to the major component logic trees. The entire logic model is built by adding the next logic gate to the outlet of the prior logic gate for each major component in the connected path.

The state model, abbreviated SM, is a collection of logic diagrams, one for each plant system, that relate the operational status or "STATE" of each system with respect to their ability to perform their operating function. The availability of the system is determined by the availability of its individual components. A system may be unavailable if certain critical components are out of service. The availability of the necessary components is determined through the state model logic diagram. "AND" gates are used when each contributing component to the system flow path must be available. "OR" gates are used when only one of a plurality of parallel contributing components to the system flow path must be available.

Having described the present invention with reference to the presently preferred embodiment thereof, it should be apparent that various changes can be incorporated without departing from the true spirit of the invention as defined in the appended claims.

What is claimed is:

1. For use in overseeing the maintenance and operation of an operating plant in accordance with a pre-recorded program, recording media containing a series of instructions in machine readable form for programming a general purpose computer, said instructions comprising:

entries for enabling a user to select by input to the computer a discrete physical component from all of the physical components of at least a segment of an operating plant; and entries for causing the computer to use stored data to provide for said selected component the identification of all physical components that are directly connected to said selected component.

2. Recording media according to claim 1, further comprising entries for causing the computer to provide for all of said identified directly connected components an indication whether said directly connected components are upstream or downstream of said selected component.

3. Recording media according to claim 2, further comprising entries for causing the computer to provide:

a graphical image display containing said components; and a graphical distinguishing identification of the component that was selected.

4. Recording media according to claim 3, further comprising entries for causing the computer to provide:

a graphical distinguishing identification of said components that are directly connected to said selected component.

5. Recording media according to claim 3, further comprising entries for causing the computer to provide:

a graphical identification of the operational state of said selected component.

6. Recording media according to claim 4, further comprising entries for causing the computer to provide:
a graphical distinguishing identification of the operational states of said components that are directly connected to said selected component.

7. Recording media according to claim 1, further comprising entries for causing the computer to provide:
a graphical image display containing said components; and
a graphical distinguishing identification of the component that was selected.

8. Recording media according to claim 7, further comprising entries for causing the computer to provide:
a graphical identification of the operational state of said selected component.

9. Recording media according to claim 7, further comprising entries for causing the computer to provide:
a graphical distinguishing identification of said components that are directly connected to said selected component.

10. Recording media according to claim 9, further comprising entries for causing the computer to provide:
a graphical identification of the operational states of said components that are directly connected to said selected component.

11. Recording media according to claim 1, further comprising entries for enabling a user to enter into the computer a request to remove from service said selected discrete component.

12. Recording media according to claim 1, wherein said entries comprise entries for causing the general purpose computer to display an interactive intelligent schematic diagram of all of the physical components of said segment of an operating plant.

13. Recording media according to claim 1, further comprising entries for causing the computer to provide:
a graphical image display containing said components; and
a graphical identification of the collection of physical components that constitute an isolation boundary for said component that was selected.

14. For use in overseeing the maintenance and operation of an operating plant, a general purpose computer when programmed to:
display on a monitor screen at least one drawing of at least a portion of the operating plant;
provide means for enabling a user to select from said drawing by input to the computer a discrete physical component from all of the physical components of at least a segment of said operating plant; and
cause the computer to use stored data to provide for said selected component on said monitor screen the identification of all physical components that are directly connected to said selected component.

15. For use in overseeing the maintenance and operation of an operating plant, a general purpose computer when programmed according to claim 14, further programmed to:
cause the computer to provide for all of said identified directly connected components an indication whether said directly connected components are upstream or downstream of said selected component.

16. For use in overseeing the maintenance and operation of an operating plant, a general purpose computer when programmed according to claim 15, further programmed to provide:
a graphical image display containing said components; and
a graphical distinguishing identification of the component that was selected.

17. For use in overseeing the maintenance and operation of an operating plant, a general purpose computer when programmed according to claim 16, further programmed to provide:
a graphical distinguishing identification of said components that are directly connected to said selected component.

18. For use in overseeing the maintenance and operation of an operating plant, a general purpose computer when programmed according to claim 14, further programmed to:
display an interactive intelligent schematic diagram of all of the physical components of said segment of an operating plant.

19. For use in overseeing the maintenance and operation of an operating plant in accordance with a pre-recorded program, recording media containing a series of instructions in machine readable form for programming a general purpose computer, said instructions comprising:
entries for establishing means for applying stored rules relating to any component that is a member of a collection of components that define an isolation boundary for providing instructions as to the operational position of said component required to achieve the isolation boundary.

20. For use in overseeing the maintenance and operation of an operating plant in accordance with a pre-recorded program, recording media containing a series of instructions in machine readable form for programming a general purpose computer, said instructions comprising:
entries for establishing means for applying stored rules relating to any component that is a member of more than one collection of components, where each collection of components constitutes the isolation boundary for a different component to be isolated, for identifying when the required operational positions determined for said boundary establishing component in each of said collections are mutually exclusive or in conflict.

21. For use in overseeing the maintenance and operation of an operating plant in accordance with a pre-recorded program, recording media containing a series of instructions in machine readable form for programming a general purpose computer, said instructions comprising:
entries for enabling a user to select a discrete component from all of the components of at least a segment of an operating plant;
entries for causing the computer to use stored data to provide for said selected component the identification of all components that are directly connected to said selected component;
entries for enabling a user to enter a request to remove from service said selected discrete component; and
wherein said programming of said computer includes establishing means for applying stored rules relating to any selected component for identifying conflicting operational positions indicating that said selected component can not be removed from service.

22. For use in overseeing the maintenance and operation of an operating plant in accordance with a pre-recorded program, recording media containing a series of instructions in machine readable form for programming a general purpose computer, said instructions comprising:
entries for enabling a user to select a discrete component from all of the components of at least a segment of an operating plant;

entries for causing the computer to use stored data to provide for said selected component the identification of all components that are directly connected to said selected component;

entries for enabling a user to enter a request to remove from service said selected discrete component; and entries for causing the computer to use stored data to determine, based upon parameters associated with said selected discrete component and the operating plant of which it forms a part, whether said selected component can be safely removed from service, and providing an output responding to said request.

23. For use in overseeing the maintenance and operation of an operating plant in accordance with a pre-recorded program, recording media containing a series of instructions in machine readable form for programming a general purpose computer, said instructions comprising:

entries for enabling a user to select a discrete component from all of the components of at least a segment of an operating plant;

entries for causing the computer to use stored data to provide for said selected component the identification of all components that are directly connected to said selected component;

wherein said entries comprise entries for causing the general purpose computer to display an interactive intelligent schematic diagram of said segment of an operating plant; and wherein said interactive intelligent schematic diagram consists of an assemblage of objects each defined by component information obtained from a computer assisted drawing data file.

24. Recording media according to claim 23, wherein said programming of said computer includes establishing means for associating any selected one of said objects with data stored in text based data files.

25. Recording media according to claim 24, wherein said programming of said computer includes establishing means for applying stored rules relating to any selected component object for providing instructions as to when and how said selected component can be removed from service for maintenance.

26. Recording media according to claim 25, wherein said programming of said computer includes establishing means for selectively automatically analyzing the data underlying said intelligent schematic diagram and producing a logic diagram based upon flow through said objects.

27. Recording media according to claim 23, wherein said programming of said computer includes establishing means for selectively automatically analyzing the data underlying said intelligent schematic diagram and producing a logic diagram based upon flow through said objects.

28. For use in overseeing the maintenance and operation of an operating plant, a general purpose computer when programmed to:

display on a monitor screen at least one drawing of at least a portion of the operating plant;

provide means for enabling a user to select from said drawing a discrete component from all of the components of at least a segment of said operating plant;

cause the computer to use stored data to provide for said selected component the identification of all components that are directly connected to said selected component; and display an interactive intelligent schematic diagram of said segment of an operating plant;

wherein said interactive intelligent schematic diagram consists of an assemblage of objects each defined by component information obtained from a computer assisted drawing data file.

29. For use in overseeing the maintenance and operation of an operating plant, a general purpose computer when programmed according to claim 28, and wherein said programmed computer includes means for associating any selected one of said objects with data stored in text based data files.

30. For use in overseeing the maintenance and operation of an operating plant, a general purpose computer when programmed according to claim 29, and wherein said programmed computer includes means for applying stored rules relating to any selected component object for providing instructions as to when and how said selected component can be removed from service for maintenance.

31. For use in overseeing the maintenance and operation of an operating plant, a general purpose computer when programmed according to claim 30, and wherein said programmed computer includes means for selectively automatically analyzing the data underlying said intelligent schematic diagram and producing a logic diagram based upon flow through said objects.

32. For use in overseeing the maintenance and operation of an operating plant, a general purpose computer when programmed according to claim 28, and wherein said programmed computer includes means for selectively automatically analyzing the data underlying said intelligent schematic diagram and producing a logic diagram based upon flow through said objects.

* * * * *